United States Patent [19]

Takemura et al.

[11] Patent Number: 5,220,509
[45] Date of Patent: Jun. 15, 1993

[54] VEHICLE NAVIGATION APPARATUS

[75] Inventors: Shinichi Takemura; Tsutomu Honda; Kenichiro Kawasaki; Isao Endo; Shozaburo Sakaguchi, all of Saitama, Japan

[73] Assignee: Pioneer Electronic Corporation, Tokyo, Japan

[21] Appl. No.: 657,804

[22] Filed: Feb. 20, 1991

[30] Foreign Application Priority Data

Apr. 27, 1990 [JP] Japan ................................ 2-110541

[51] Int. Cl.⁵ ............................................ G06F 15/50
[52] U.S. Cl. .................................. 364/449; 364/454; 342/357; 340/988
[58] Field of Search ............... 364/443, 449, 454, 457; 33/356, 357; 342/357, 451, 457; 340/988, 990, 995

[56] References Cited

U.S. PATENT DOCUMENTS

| | | | |
|---|---|---|---|
| 4,713,767 | 12/1987 | Sato et al. | 364/454 |
| 4,731,613 | 3/1988 | Endo et al. | 342/357 |
| 4,743,913 | 5/1988 | Takai | 33/356 |
| 4,837,700 | 6/1989 | Ando et al. | 364/449 |
| 4,890,233 | 12/1989 | Ando et al. | 364/457 |
| 4,903,212 | 2/1990 | Yokouchi et al. | 364/443 |

FOREIGN PATENT DOCUMENTS 3227547  2/1984  Fed. Rep. of Germany .

Primary Examiner—Gary Chin
Attorney, Agent, or Firm—Sughrue, Mion, Zinn, Macpeak & Seas

[57] ABSTRACT

A vehicle navigation apparatus comprises a self-contained positioning system, GPS positioning system, and a controller for performing arithmetic operation on the basis of the output of any one of the self-contained positioning system and the GPS positioning system so as to display various navigation information on a display. The controller corrects the bearing data based on the self-contained positioning system with respect to that based on the GPS positioning system if the bearing data of self-contained positioning system differs from that of the GPS positioning system by more than a predetermined value when a vehicle velocity determined on the basis of the position data from any one of the positioning systems exceeds a predetermined value.

4 Claims, 2 Drawing Sheets

VEHICLE NAVIGATION APPARATUS

BACKGROUND OF THE INVENTION

1. Field of the Invention

The present invention relates to a vehicle navigation apparatus which has the GPS positioning system based on a GPS (Global Positioning System) receiver and the self-contained positioning system based primarily on vehicle-velocity sensors and bearing sensors, and displays various navigation information on the basis of the output of either the self-contained positioning system or the GPS positioning system under control of a controller.

2. Prior Art

It is well known that the GPS positioning system is superior in accuracy to the self-contained positioning system. Thus, conventional vehicle navigation apparatuses normally display various navigation information based on position data from the GPS positioning system, and display information from the self-contained positioning system when proper navigation information is not available from the GPS positioning system for various reasons. In this way the navigation information can be supplied from either the GPS positioning system or the self-contained positioning system to the displayer. However, geomagnetism is usually very weak and therefore a geomagnetic sensor as a bearing sensor used in the self-contained positioning system, is quite susceptible to external disturbances. Thus, error results when the geomagnetic sensor is magnetized, the vehicle is magnetized, or when the vehicle runs along a railway or runs across a railway.

The gyro used as a bearing sensor in the self-contained positioning system tends to be affected by external disturbances and results in errors that accumulate. In order to correct the bearing data of the bearing sensor in the self-contained positioning system, it is necessary not only to reset the offset values but also to correct the bearing sensor against some more accurate reference. This is an inconvenient and time consuming task.

SUMMARY OF THE INVENTION

The present invention was made in view of the aforementioned drawbacks. An object of the invention is to provide a vehicle navigation apparatus in which the bearing data of the bearing sensor in the self-contained positioning system is automatically corrected with respect to that of the GPS positioning system as well as the accumulated error is minimized.

In a vehicle navigation apparatus according to the present invention, when the vehicle velocity calculated on the basis of the output of the self-contained positioning system or GPS positioning system is over a predetermined value, a decision is made based on whether the error in bearing data based on the self-contained positioning system with respect to the GPS positioning system is greater than a given value. If the error in bearing data of the self-contained positioning system is greater than a given value, then the bearing data of the self-contained positioning system is corrected by the bearing data from the GPS positioning system.

BRIEF DESCRIPTION OF THE DRAWINGS

Features and other objects of the invention will be more apparent from the detailed description of the preferred embodiment with reference to the accompanying drawings in which.

DETAILED DESCRIPTION OF THE PREFERRED EMBODIMENTS

Embodiment

Figure 1:
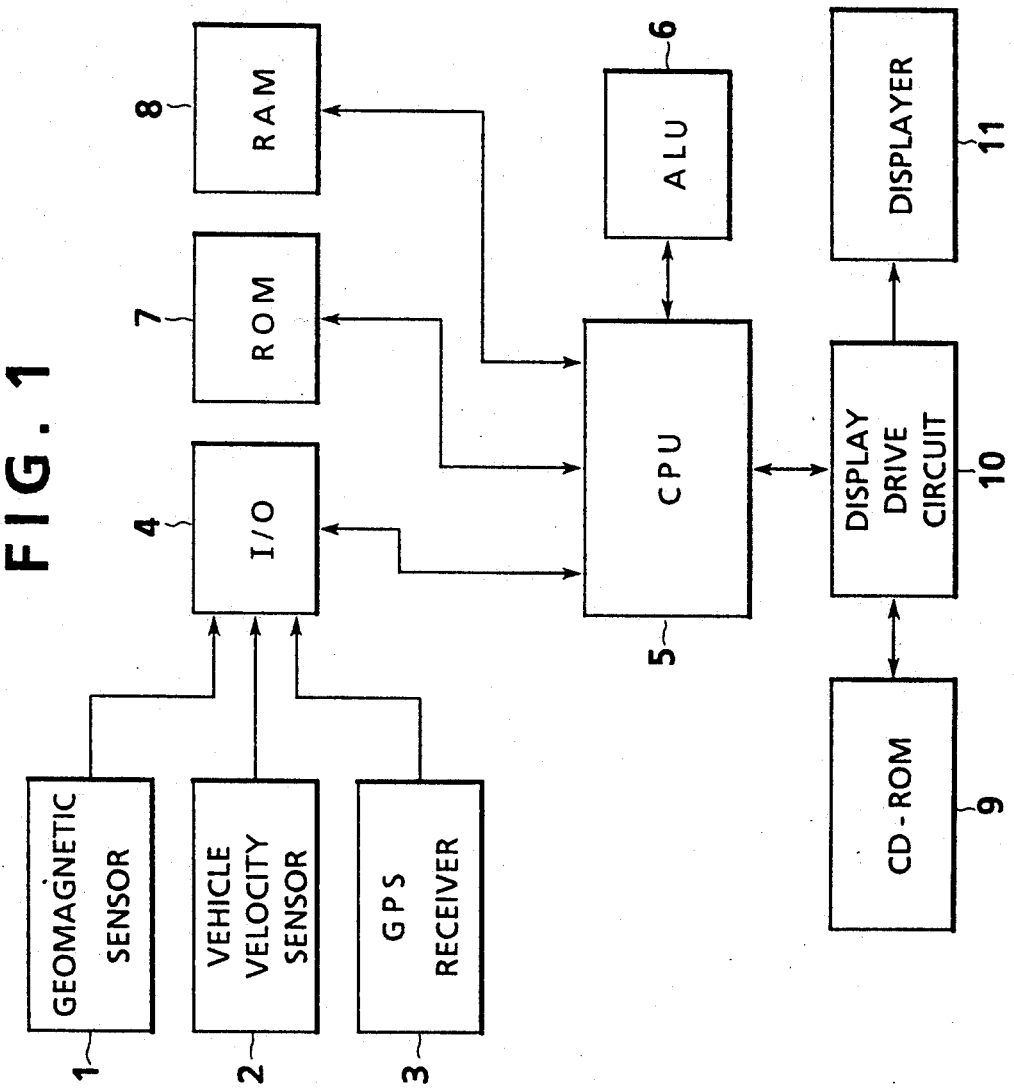
FIG. 1 is a block diagram showing a general configuration of an embodiment of a vehicle navigation apparatus according to the present invention.

FIG. 1 is a block diagram showing the general configuration of an embodiment of a vehicle navigation apparatus according to the present invention. A GPS receiver 3 receives the waves from at least three satellites so as to determine the present position of the vehicle. A CPU 5 receives the present position data from the GPS receiver 3 via an I/O 4. Transmitting and receiving the data between an arithmetic logic unit 6 and a RAM 8, the CPU 5 performs calculation of various data to be supplied to the displayer under control of the system program stored in a ROM 7.

When the vehicle is running on a road, the navigation system displays at each moment various navigation information based on the present position of the vehicle such as the velocity of the vehicle and the bearing or direction in which the vehicle is running.

Meanwhile, a self-contained positioning system consists of a vehicle velocity sensor 2 such as a pulse generator and a geomagnetic sensor 1. The CPU 5 receives the data from the geomagnetic sensor 1 and the vehicle velocity sensor 2 via an I/O 4. Transmitting and receiving the data between the arithmetic logic unit 6 and the RAM 8 under control of the system program stored in a ROM 7, the CPU 5 calculates various data such as the position data indicative of the present position of the vehicle velocity, bearing data or direction in which the vehicle is running, and supplies to the displayer.

Generally, the GPS positioning system is much more accurate than the self-containing system. When the vehicle is running at a reasonably high speed, for example 10 km/h, the GPS positioning is reasonably accurate. However, when the vehicle is running at a speed much slower than 10 km/h, GPS positioning is not quite accurate because the distance the vehicle traveled in a given time length is too short to be detected accurately. In which case, the self-contained positioning system is much more reliable than the GPS positioning system. In the present invention, the bearing correction data is calculated on the basis of the error in bearing data of self-contained positioning system with respect to the bearing data obtained from the GPS positioning system, and is stored into the RAM. This bearing correction data is used to correct the bearing data of the self-contained positioning system when the information from the GPS positioning system is not properly obtained.

A microcomputer-based display-drive circuit 10 receives the outputs of the CPU 5 and the map data in the CD-ROM 9, and edits the map data so as to display the map information on a displayer 11. The I/O 4, CPU 5, arithmetic logic unit 6, ROM 7, and RAM 8 constitute a microcomputer-based controller as a whole which controls associated devices such as the CD-ROM 9, drive circuit 10, and displayer 11.

Operation

Figure 2:
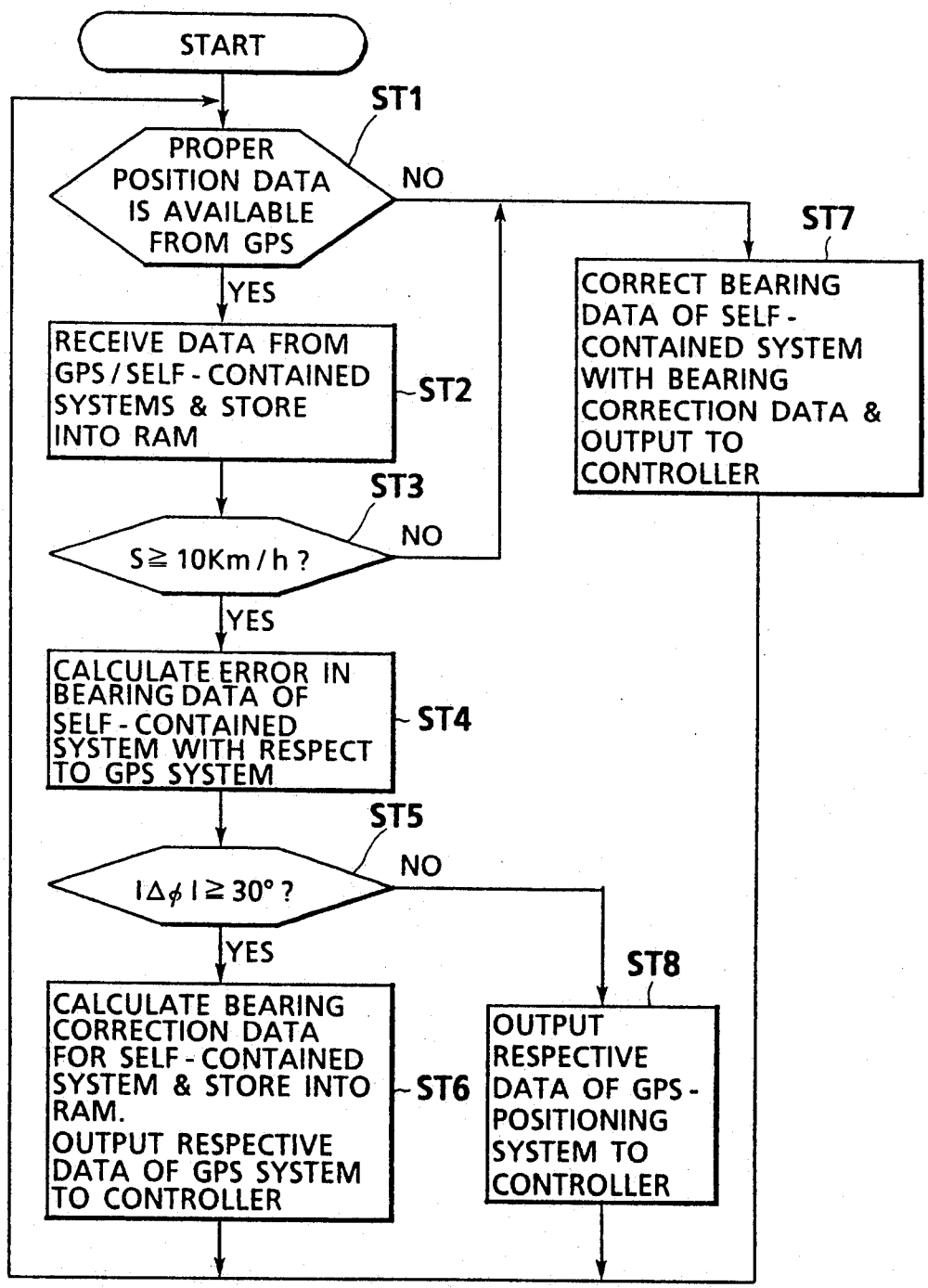
FIG. 2 is a flowchart showing the operation of the present invention.

FIG. 2 is a flowchart showing the operation of the present invention. First, a decision is made based on whether or not proper data from the GPS positioning system is available (step 1). If the data is available, the CPU receives the respective data from both self-contained positioning system and GPS positioning system, and stores the data into the RAM 8 (step 2). At step 3, if the vehicle velocity data determined on the basis of the output from either the self-contained positioning system or the GPS positioning system is above a predetermined value, for example, 10 km/h, then the arithmetic logic unit 6 calculates the error $\Delta\phi$ in bearing data of the self-contained positioning system with respect to the GPS positioning system (step 4). Then, a decision is made based on whether the absolute value of the error $\Delta\phi$ in bearing data is greater than a predetermined value, for example, 30 degrees (step 5). If the error is more than 30 degrees in step 5, then the CPU produces a bearing correction data for the self-contained positioning system with respect to the GPS positioning system and then stores it into the RAM 8 as well as outputs the respective data to the drive circuit 10 (step 6). Then, the program returns to step 1.

If the proper data is not available from the GPS positioning system at step 1, or if the vehicle velocity is below, for example, 10 km/h at step 3, the bearing data of the self-contained system is corrected by the bearing correction data stored in the RAM and is outputted to the drive circuit 10 together with other data (step 7), then the program returns to step 1.

If the error in bearing data is less than 30 degrees, then the CPU 5 outputs the respective data received from the GPS positioning system to the drive circuit 10 (step 8), and then the program returns to step 1.

The drive circuit 10 receives the respective data from the CPU 5 and outputs to the displayer 11. The drive circuit 10 also edits the map data read from the CD-ROM 9 as required on the basis of the data from the CPU 5 so as to display map information on the displayer 11.

While the above embodiment has been described with respect to an apparatus in which the arithmetic logic unit 6 and the CPU 5 are formed of separate devices, respectively, the CPU 5 may be arranged to perform the role played by the unit 6.

What is claimed is:

1. A vehicle navigation apparatus comprising a self-contained positioning system based on a bearing sensor and a vehicle velocity sensor, a GPS positioning system based on a GPS receiver, and a controller for performing arithmetic operation on the basis of outputs from any one of the self-contained positioning system and the GPS positioning system so as to display various navigation information on a display; wherein
said controller corrects bearing data obtained from said self-contained positioning system based on bearing data obtained from said GPS positioning system only if the bearing data of said self-contained positioning system differs from the bearing data from said GPS positioning system by more than a predetermined value and only if a vehicle velocity determined based on the outputs of any one of said self-contained positioning system and said GPS positioning system is above a predetermined non-zero threshold value.

2. A vehicle position calculation apparatus including both a GPS positioning system and a self-contained positioning system, said apparatus comprising:
availability determining means for determining whether correct position data is available from a GPS positioning system;
receiving means for receiving positioning data from both said self-contained positioning system and said GPS positioning system when said availability determining means determines that correct position data is available from said GPS positioning system;
velocity obtaining means for obtaining the velocity of said vehicle based on the received positioning data from either said GPS positioning system or said self-contained positioning system;
velocity value checking means for checking the value of said velocity obtained from said velocity obtaining means to determine whether the velocity is greater than a predetermined non-zero threshold value; and
present positioning determining means for determining the present position of said vehicle
(a) using the received positioning data from said self-contained positioning system when said velocity value checking means determines that the velocity is not greater than said predetermined threshold value, and
(b) using the received positioning data from said GPS positioning system when said velocity value checking means determines that the velocity is greater than said predetermined threshold value.

3. An apparatus according to claim 2 wherein said present position determining means further includes:
error calculating means for calculating an error in the received positioning data from said self-contained positioning means when the velocity is greater than said predetermined threshold value;
error value checking means for checking the calculated error to determine whether it is greater than a second predetermined error value; and
calculation means for calculating correction data when said error value checking means determines that said error is greater than said second predetermined value.

4. An apparatus according to claim 3 wherein said error calculating means includes:
comparison means for comparing the received positioning data from said GPS positioning system with the received positioning data from said self-contained positioning system.

* * * * *